United States Patent

Johnson

[15] 3,655,223

[45] Apr. 11, 1972

[54] CASING JOINT

[72] Inventor: Douglas Johnson, Indianapolis, Ind.

[73] Assignee: General Motors Corporation, Detroit, Mich.

[22] Filed: Sept. 17, 1969

[21] Appl. No.: 858,698

[52] U.S. Cl.....................285/39, 285/187, 285/328, 285/382, 285/398, 285/407, 285/422
[51] Int. Cl..............................................F16l 35/00
[58] Field of Search................285/39, 187, 330, 364, 365, 285/366, 367, 371, 407, 408, 409, 410, 411, 420, 302; 287/189.366, 111, 118

[56] References Cited

UNITED STATES PATENTS

| 665,003 | 1/1901 | Haigh | 285/382.2 |
|---|---|---|---|
| 831,551 | 9/1906 | Guttzeit | 285/411 X |
| 880,507 | 3/1908 | Cook | 285/398 X |
| 2,601,995 | 7/1952 | Skopil | 285/364 X |
| 2,673,659 | 3/1954 | Moore | 287/189.366 |
| 2,759,574 | 8/1956 | Miller | 287/189.366 |
| 3,529,855 | 9/1970 | Bragg | 285/398 X |

FOREIGN PATENTS OR APPLICATIONS

| 882,501 | 11/1961 | Great Britain | 285/407 |
|---|---|---|---|
| 547,628 | 9/1956 | Italy | 285/366 |

*Primary Examiner*—Dave W. Arola
*Attorney*—Paul Fitzpatrick and Jean L. Carpenter

[57] ABSTRACT

A gas turbine engine casing is joined at circumferential split lines by coupling members formed as rings having flanges which interlock with flanges on the casing sections to hold them against separation and having flanges which are deformed to bear directly or indirectly against the outer surface of the casing to hold the first flanges in engagement. The coupling ring as provided includes a third flange which provides an abutment or reaction surface for a tool which deforms the second flange. A heat shield may be provided on the coupling ring. If a gap between the ends of the ring is necessary for fitting, this is closed by a plug or key on which an internal head is formed by exertion of radial force. The flange on the ring or key against which the force reacts may be removed after the joint is completed. The same sort of joint may be provided at axial or other split lines. The deformed flanges may be pressed against teeth on the casing sections to provide a positive anti-torque connection.

29 Claims, 10 Drawing Figures

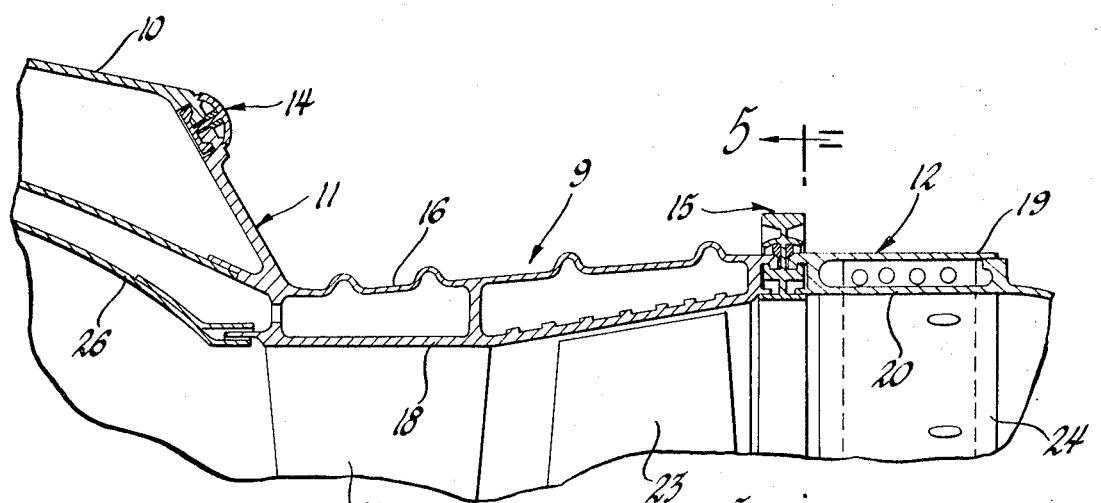
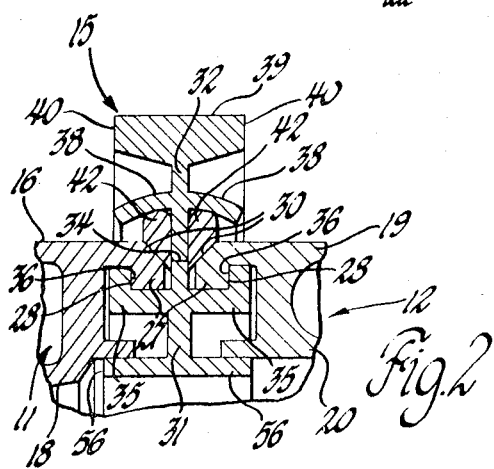
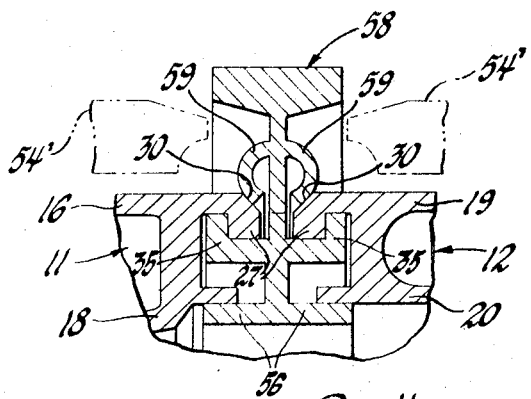
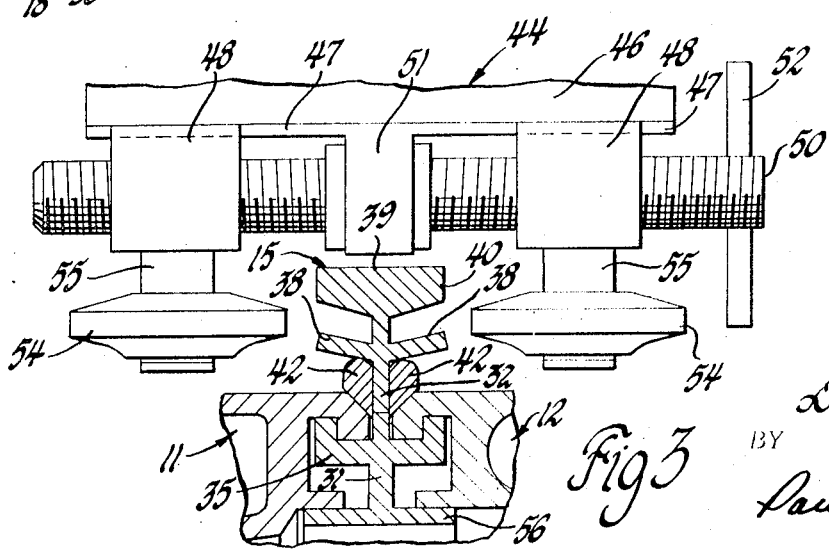
INVENTOR
Douglas Johnson
BY
Paul Fitzpatrick
ATTORNEY

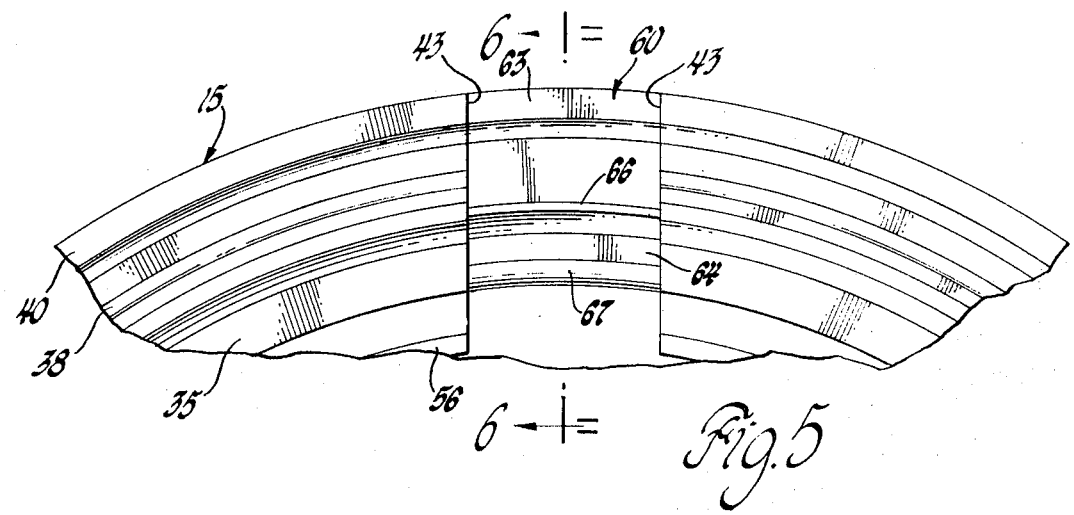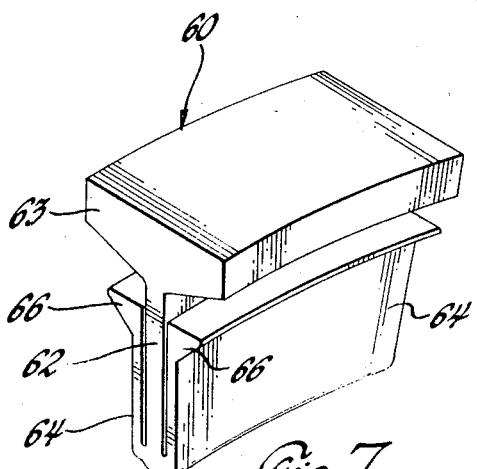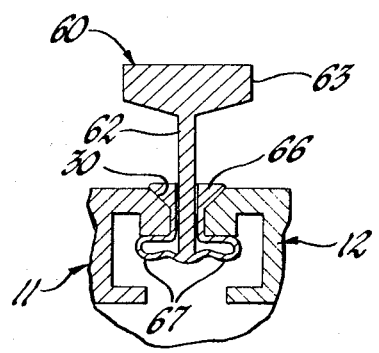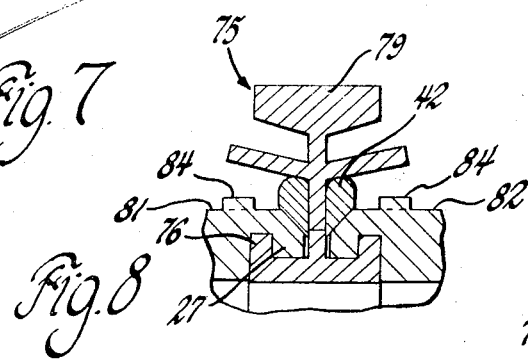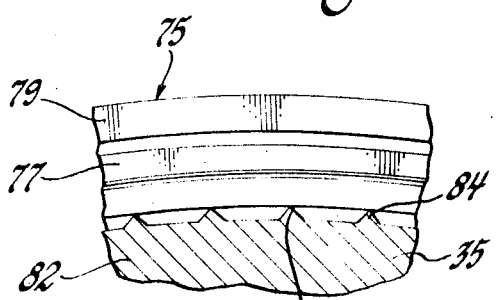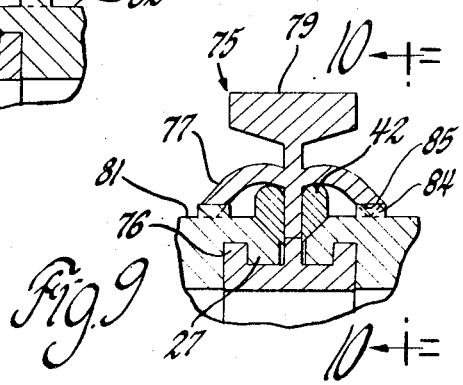

CASING JOINT

"The invention herein described was made in the course of work under a contract or subcontract thereunder with the Department of Defense."

DESCRIPTION

My invention is directed to joints between parts of walls or casings of various sorts, particularly those which contain a fluid under pressure such as pressure vessels, gas ducting, and the casings of gas turbine engines. The invention is particularly suitable to provide a lightweight, strong, rigid, readily applied joint between adjacent sections of the outer casing of a gas turbine engine, for example, and is so described herein. However, as will be apparent to those skilled in the art, the principles of my casing joint are applicable to various situations.

Particularly with reference to the casings of aircraft gas turbines, jet engine exhaust pipes, and the like, there is a need for structures which are as light in weight as possible but which are capable of withstanding substantial separating forces as well as vibrations, high temperature, and other adverse conditions. In turbojet lift engines, the minimization of unnecessary weight is particularly vital. In other applications the weight problem in casing joints may not be so acute, but it is still present, and as far as I am aware there has not yet been a solution to this problem which has been generally considered satisfactory.

It will be appreciated that separating forces in the casings of gas turbine engines of normal or large size due to the pressure of contained gas are quite substantial. The conventional approach to joining casing sections lies in providing flanges along circumferential or axial split lines which are coupled by through bolts and nuts. For circumferential joints, another approach has been the use of a circumferentially tensioned ring embracing flanges on the casing sections. A less conventional approach to the problem is disclosed in U.S. Pat. No. 3,014,741 of C. J. McDowall for Multimember Joints. All of these expedients result in joints which are bulkier, heavier, and usually more difficult to machine and assemble than the joint arrangement which is the subject of my invention.

According to the preferred embodiment of my invention, the two parts to be joined have juxtaposed edges with flanges on one surface defining abutments spacing away from each other and abutments on the other surface facing toward each other. The abutments which face away from each other are coupled by recurved flanges on a coupling strip or ring which includes deformable flanges which directly or indirectly engage the other surface of the casing section. The recurved flanges hold the parts together against forces tending to separate them and the engagement with the abutments which face together holds them securely apart, preventing any rattle or shake in the joint when the pressure is not present. The coupling ring or strip includes a removable flange which provides a reaction surface for a forming tool which deforms the plastic flange to secure the connecting joint member and may thereafter be removed. The result is a strong, lightweight, compact, positive, relatively leakproof, semi-permanent joint which, however, may be taken apart by machining away parts of the coupling ring.

The nature of my invention and its advantages will be clear to those skilled in the art from the succeeding detailed description of preferred embodiments of the invention and the accompanying drawings thereof.

FIG. 1 is a fragmentary view of the casing of a turbojet engine taken in a plane containing the axis of rotation of the turbine and illustrating two applications of casing joints according to the invention.

FIG. 2 is a cross-section of a joint which may be an enlarged view of a portion of FIG. 1.

FIG. 3 is a view corresponding to FIG. 2 illustrating a step in the formation of the joint.

FIG. 4 is a view similar to FIG. 2 illustrating a modified form of joint structure.

FIG. 5 is an enlarged transverse sectional view on the plane indicated by the line 5—5 in FIG. 1, with curvature exaggerated.

FIG. 6 is a sectional view through a sealing key employed between the ends of the coupling ring taken on the plane indicated by the line 6—6 in FIG. 5.

FIG. 7 is an axonometric view of the sealing key before insertion.

FIG. 8 is a sectional view of a casing joint with an antitorque lock, before deforming.

FIG. 9 is a similar view after deforming.

FIG. 10 is a fragmentary cross-sectional view taken on the plane indicated by the line 10—10 in FIG. 9.

Referring first to FIG. 1, a turbojet engine 9 includes a first casing section 10, a second casing section 11, and a third casing section 12, these three defining a portion of the outer wall of an engine which may be of conventional type. The casing contains gas under pressure which flows through the engine and therefore may be considered as exemplary of a pressure vessel or duct for gas under pressure as well as exemplary of an engine outer case. Sections 10 and 11 are joined together by a coupling member or coupling ring 14 and sections 11 and 12 by a coupling ring arrangement 15 which is illustrated in course of application to sections 11 and 12. The casing sections 11 and 12 are double walled, the former having an outer wall 16 and an inner wall 18, and the latter including an outer wall 19 and an inner wall 20. The space between the walls may be a conduit for cooling air.

A ring of turbine nozzle vanes 22 extends inwardly from the casing section 11 and blades 23 of a turbine wheel rotate inside the casing section. Struts 24 extend inwardly from the casing section 12 to support a turbine bearing or inner tailcone of the engine. The turbine is supplied by a combustion apparatus defined in part by wall 26 mounted within the section 10. Details of such an engine are immaterial to this invention; however, for purposes of illustration, mention may be made of my prior U.S. Pat. Nos. 3,286,461 for Turbine Starter and Cooling and 3,332,242 for Aft Fan Jet Engine which disclose more fully structures of engines of the general type to which reference is made in FIG. 1.

One example of a casing joint according to my invention is shown more clearly in FIG. 2 which shows joint 15 between the engine casing sections 11 and 12, or any other joint of similar structure.

The meeting planes of casing sections such as at 14 and 15 are commonly referred to in the art as "split lines." The split lines illustrated are circumferential lines, but the term applies also to longitudinal casing joints, and the invention is applicable to casing joints however oriented. However, the application to circumferential joints may be somewhat more difficult than to an axial joint, so that circumferential joints are emphasized in this disclosure to explain the principles of the invention.

Referring to FIG. 2, it will be noted that the adjacent ends of the casing sections or walls 11 and 12 are juxtaposed, being spaced slightly apart. These casing sections bear inwardly directed flanges 27 the rear surfaces of which define abutments 28 directed away from the adjacent shell, these abutments being radial or, more generally, being directed approximately perpendicularly to the surface of the casing or shell. The ends of the casing section also are chamfered on the outer surface as indicated at 30, these chamfers defining abutments facing toward the adjacent casing section.

The coupling member 15 of FIG. 2 is a 360° metal ring with a single split which provides a gap in the ring so that it may be fitted into place by radial expansion. The coupling member 15 has a radially extending web made up of two parts, an inner ring 31 and an outer ring 32, these being joined together by an annular weld or other suitable bond at 34. The reason for this bimetallic structure is that the inner portion of the ring performs the duty of holding the casing sections together against the pressures exerted on them and, in the illustrated case, also needs to be a high temperature resisting material. In this particular example, the inner ring is Inco 718, high temperature resisting material of low ductility which cannot be cold formed after heat treatment. The outer portion of the ring is of 347 stainless steel which is less temperature resisting and which is ductile. The need for the ductility will be made apparent.

The high temperature resisting portion of the ring includes aligned connecting flanges 35 extending from both faces of the web, these flanges being recurved so as position, define a radial shoulder 36 which abuts the corresponding abutment 28 when the parts assembled. Tension in the case is thus taken from the first abutment 36 through shoulder 28 and the flanges 35 to the second abutment 36 and shoulder 28. Since the ring is split, it may be overlapped so as to fit into the casing past the flanges 27 and then may be expanded outwardly to the position shown, in which it bears against the radially inner surface of the casing. The coupling ring is retained in this position by means bearing against the outer surface of the casing, which, in the preferred structure, also biases the casing sections apart so that there is no lost motion between the parts when they are not held apart by the contained pressure.

In the structure shown in FIG. 2, the means for retaining the coupling ring in active position comprises ductile flanges 38 extending from both faces of the web portion 32. The outer portion of the ring 15 also includes an outer ring or abutment 39, of considerably more massive structure than the flanges 38, which defines a flange or head 40 extending from each face of the web 32 overlying the flanges 38. The operative parts of the casing joint of FIG. 2 are completed by two filler rings 42 disposed between the flanges 38 and the abutments 30 of the casing sections and bearing against the web 31, 32. The filler ring or strip 42 may be, and in many cases preferably is, made up of a number of segments but it is immaterial to the operative character of the filler strip whether or not it is segmented. The purpose of the filler strip 42 is to act as a wedge to transmit force from the ductile flanges 38 to the case and to provide a clearance for the flanges 35 of the coupling member to clear the flanges 27 of the case in assembly.

The strips 42 preferably have rounded radially outer faces adjacent flanges 38 and have beveled or wedge-shaped inner edges to engage chamfers 30.

The compressive loads between member 38 and the cases are carried through filler strips 42 and pass through the angle face 30. The lower strength ductile outer element is permitted by the use of the angular wedge to carry the compressive loads. The angle of the wedge may be selected for the appropriate relation between the tensile and compressive loads and to the strengths of the material selected.

In this connection, the filler strips 42 are put into place after the coupling member is lodged against the inner surface of the casing section but before the flanges 38 have been deformed. As shown in FIG. 3, the flanges 38 incline outwardly from the case as they extend away from the web. It is possible to insert the filler strips 42 under the flanges by sliding them into place axially of the casing and rotating them under the flange or by sliding them in at the gap between the ends 43 of the coupling ring as shown in FIG. 6.

FIG. 3 also illustrates a tool which may be employed for exerting a separating force between the flanges 40 and 38 to deform the flanges 38 into tight contact with the filter strips 42. As shown, the tool 44, which may be referred to as a forming tool for convenience, comprises a body 46 defining ways 47 upon which heads 48 are reciprocable. The heads 48 may be moved together or apart by a reverse threaded screw 50 having a thrust bearing in a portion 51 of the body and in threaded engagement with the heads 48. Screw 50 may be turned by a handle 52. Each head 48 bears a forming roller 54 of proper contour to enter with a wedging and separating action between the flanges 40 and 38. Forming rollers 54 are freely rotatable on pintles 55 extending from the heads 48. As will be apparent, by advancing the heads 48 toward each other and traversing the tool 44 along the coupling member 15, the relatively thin section flange 38 is deformed so as to bear positively against the filler strips 42 and hold the flanges 35 against the interior of the casing sections.

While it is possible to leave the outer portion of the coupling strip beyond the flange 38 in place after the assembly has been completed, it is ordinarily desirable to remove it as a matter of reducing weight and possible obstruction to other elements. This may readily be done by a machining operation such as turning or grinding. The joint thus made is of a semi-permanent nature but may be separated without damage to the casing sections by cutting off the flanges 38.

The coupling member 15 embodies another feature which may be desirable where the rings are used in hot environments, and particularly with double-walled structures. This is embodied in shield flanges 56 extending from the inner edge of the web portion 31 and bearing against the inner surface of the casing sections. The shield flange shields the structural flanges 35 to some extent from the hot motive fluid flowing through the turbine. A flange such as 56 may also be provided in some cases as a fairing or as means to improve the sealing ability of the coupling with respect to leakage from the interior to the exterior of the casing or duct. The flanges 56 do not limit the outward movement of the coupling member into its seated position. They are spaced so as to allow full seating or may yield slightly to allow full seating. Not being a structural element, they need not be particularly rigid.

The coupling member 14 shown in FIG. 1 may be of the same general type as the coupling member 15 just described except that it does not include the additional shielding flange 56, nor does the web 31 extend inwardly of the connecting flanges 35. It will be noted that the member 14 is on a steeply tapering portion of the casing and the same type of coupling member can be used even though the casing surfaces joined are strictly radial rather than axial or tapering.

FIG. 4 shows a modified form of the coupling member identified as coupling member 58. This is of the same configuration in most respects as the coupling member 15 of FIG. 2. However, it is applied in a different manner. In the installation shown in FIG. 4, the filler strips 42 are omitted. Instead, flanges 59 which correspond to the flanges 38 of FIG. 2 are deformed sharply toward each other and toward the casing section, being rebent so that the margins of these flanges bear against the chamfered abutments 30 on the casing sections 11 and 12. This may be accomplished by a swaging tool bearing rollers of the general form indicated at 54' in FIG. 4. Since the remainder of the casing joint is the same as that previously described in detail with respect to FIG. 2, it will not be further described here. It should be apparent that in this form, as in the form previously described, there is a part which is deformed to hold the connecting flanges 35 against the casing sections and to bias the casing sections apart against the shoulders on the connecting flanges.

Referring to FIG. 5, when the coupling member is in the form of a ring and is applied so that it is expanded outwardly into engagement with the casing section, there will ordinarily be a gap between the ends of the coupling ring when it is in place. The gap may be minimized by employing a segmented ring, but this is not preferred. The ends 43 of the ring preferably are finished so as to be substantially parallel when the ring is expanded into place. With a large radius circle, this is inherent. It will be understood that FIG. 5 exaggerates the curvature of the ring with respect to the usual installation. While various types of overlap of the ends of the strip might be employed, it is preferable to have the ends cut off straight and to employ means to close the gap between the ends so as to prevent leakage through the gap and also to provide a block against movement of the ends of the ring toward each other. The means which I have devised for this purpose and prefer for closing the gap between the ends 43 of the coupling ring 15 is the key 60 shown in FIGS. 5 to 8. Key 60 may be an extrusion of steel and may be straight rather than curved for the usual application to where the circumference is large. The key may be made as a long strip from which a section of desired length for the particular installation is cut off or may be otherwise produced of a desired length. Key 60 comprises a central web 62 terminating in a cross flange or head 63 similar to the head 39 of the coupling member. Two collapsible webs 64 extend back alongside the web 62 from its edge opposite the head 63. Webs 64 terminate in beveled flanges 66 which, as will be apparent from FIG. 6, are configured to fit the chamfered abutment 30 of the walls 11 and 12 to be joined. The device in its initial form as illustrated in FIG. 7 may be inserted between the ends 43 of the coupling ring until the flanges 66 bottom against the abutments 30, whereupon the flanges 66 are held in engagement with the casing by a suitable tool while the head 63 is pulled outwardly to cause the webs 64 to collapse and fold out to form the anchorage 67 shown in FIG. 6. The outer part of web 62 and the head 63 may then be machined so that this part does not project any further than the coupling ring or strip.

While I am aware that fasteners applying this mode of retention are commercially available, I am not aware of any application of this principle equivalent to that which is described here to complete a coupling ring or to serve as means for closing and sealing a gap in such a ring.

The key 60 may, of course, also be used with the coupling strip 58 shown in FIG. 4.

FIGS. 8, 9, and 10 illustrate a further feature which may be incorporated in a casing joint according to my invention, such as that of FIG. 2, an anti-slip or anti-torque connection. FIGS. 8 and 9 are views similar to FIGS. 2 and 3 of a casing joint before and after deformation of the coupling member or ring 75 corresponding to member 15. However, in these views the coupling ring is illustrated as omitting the shield flanges 56, which may or may not be incorporated, depending upon the requirements of the particular installation.

Referring to the drawings, the coupling ring 75 includes flanges 76 to cooperate with flanges 27 of the casing sections, includes the deformable or ductile flanges 77, and the outer ring or abutment 79, these being joined by a web as in the coupling ring 15 previously described. In the structure illustrated in FIGS. 8 through 10, the casing sections identified as 81 and 82 are formed for cooperation with the casing joint as are the casing sections 16 and 19 previously referred to, but have additionally a ring of teeth 84, the teeth 84 projecting from the outer surface of each casing section. These teeth may be of any desired configuration and may be provided by cutting notches in low flanges on the exterior of the casing sections. The ductile flanges 77, when they are formed downwardly to engage the filler strips 42, are also forced into the interstices between teeth 84 so that the teeth 84 cut into the margins of the flanges 77, as indicated at 85 in FIG. 10.

With this structure, a positive lock against relative rotation of the casing sections about the axis of the sections or, generally, relative translation perpendicular to the plane of FIG. 8, is provided. This is in addition to the frictional restraint against such rotation which is provided in structures omitting the lock.

The preceding description has had direct relation to use of the casing coupling arrangement for circumferential joints in casings. While there is likely to be less need for its use in joints which extend axially of a casing or of shells of any sort, such axial split lines are known and the coupling joint is obviously suited to use in such installations. As a matter of fact, it may be easier to fit in an axially extending joint because there is not the matter of the gap between the ends which separate when the ring is fitted that there is when the ring is used as illustrated in FIG. 5.

It is also possible, although in most instances less convenient, to fit either an axially extending or circumferentially extending joint inside out, so to speak, so that the abutments on the casing with which the shoulders of the coupling member engage are on the outer side of the casing and the flange 38 or 59 of the coupling member is on the inside of the casing. This would have the advantage in connection with circumferential joints that the gap in the coupling member would tend to close as it is fitted into place and, therefore, there should be no need for a key or other means to close the gap which results from opening up of the coupling ring in the type of installation shown in FIG. 5. However, it would ordinarily be less convenient to deform and machine the coupling strip. Clearly, FIGS. 2, 3 and 4 can apply equally well to an axial or circumferential joint, or to an inside or outside deformable flange.

It should be apparent to those skilled in the art that the practice of my invention will result in strong, secure and lightweight connections between members of a shell or casing of any sort which is readily applied, rattle free, and well sealed. Also, one which can, if desired, be removed without damage to any part other than the coupling ring or strip itself which would have the deformable flanges machined away.

The detailed description of preferred embodiments of the invention for the purpose of explaining the principles thereof is not to be considered as limiting or restricting the invention, as many modifications may be made by the exercise of skill in the art.

I claim:

1. A pressure vessel or the like comprising, in combination, two wall sections having juxtaposed edges and a coupling member positively joining the edges of the sections, each section having a first abutment on one surface adjacent to the edge and facing away from the other section and having a second abutment forming part of the other surface adjacent to the edge and facing toward the other section, the coupling member being a strip disposed between the edges of the wall sections and defining two rigid shoulders, one shoulder engaging each first abutment to hold the sections together, and defining two plastically deformable flanges, which are plastically deformed toward said other surface thereby, cooperating with the second abutments to bias the sections apart and with the said other surface to retain the shoulders in engagement with the first abutments; the said flanges being sufficiently deformable to allow clearance for entry of the abutments into engagement with the shoulders before deformation of the flanges and to be deformed toward the said other surface for retention of the coupling member.

2. A combination as recited in claim 1 in which the deformable flanges directly engage the second abutments.

3. A combination as recited in claim 1 including also filler strips disposed between the deformable flanges and the second abutments and loaded toward the second abutments by the deformable flanges.

4. A combination as recited in claim 1 in which the coupling member includes a portion defining a reaction surface for a tool adapted to engage and deform the deformable flanges.

5. A combination as recited in claim 1 in which the edges define a closed curve and the coupling member is a split ring.

6. A combination as recited in claim 5 in which the first abutments are on the outer surface of the sections.

7. A combination as recited in claim 5 in which the first abutments are on the outer surface of the sections.

8. A combination as recited in claim 7 including also a key deformable for retention disposed in the gap defined by the split in the ring to fill the gap.

9. A combination as recited in claim 1 in which the coupling member is formed of two metallic strips bonded together to form an integral strip, one strip being of a metal more ductile than the other.

10. A combination as recited in claim 1 in which the coupling member is formed of two metallic strips bonded together, one strip being of a metal more resistant to high temperature than the other.

11. A structure comprising, in combination, first and second plates having generally coplanar edges juxtaposed along a split line and coupling means at the split line positively connecting the plates so as to withstand forces tending to separate the plates and so as to preserve the alignment of the plates, each plate having a rigid flange extending from one of the surfaces of the plate defining an abutment adjacent to and facing away from the split line, the coupling means including a strip disposed between the edges of the plate and having two rigid mutually aligned flanges each defining a shoulder engaging one of the abutments on the plates so that the interengaging abutments and shoulders positively restrain the plates against separation, the coupling means also including securing means bearing against the surface of the plates opposite to the said flanges holding the shoulders in engagement with the abutments, the securing means including means integral with the strip sufficiently plastically deformable toward the plates to allow clearance for entry of the abutments into engagement with the shoulders before deformation and deformed plastically toward the plates thereby pressing the securing means against the plates.

12. A combination as recited in claim 11 in which the edges define a closed curve and the strip is in the form of a split ring.

13. A combination as recited in claim 12 in which the ring is segmented.

14. A combination as recited in claim 12 in which the abutments are on the inner surface of the plates.

15. A combination as recited in claim 11 in which the plastically deformable means loads the plates in a sense to separate the edges.

16. A combination as recited in claim 15 including also filler strips disposed between the deformable means and the plates.

17. A combination as recited in claim 11 in which the plastically deformable means is defined by flanges extending from the strip.

18. A combination as recited in claim 17 in which the coupling means defines flanges extending from the strip over the deformable means to provide a reaction surface for a tool adapted to deform the deformable means.

19. A combination as recited in claim 11 in which one surface of the structure is exposed to hot fluid, the portion of the strip defining the shoulders being toward the surface of the structure exposed to the hot fluid and the securing means being on the other surface, the flanges defining the shoulders being of a material more highly resistant to temperature than the plastically deformable means.

20. A combination as recited in claim 19 including also a heat shield engaging the surface of the casing and shielding the flanges defining the shoulders from the hot fluid.

21. A combination as recited in claim 20 in which the heat shield is an integral part of the strip.

22. A wall comprising, in combination, two wall sections having edges juxtaposed; and a coupling member rigidly connecting the sections, the coupling member being a unitary structure including a web, rigid first flanges extending laterally from both faces of the web and including shoulders interlocking with the wall sections, the wall sections having abutments on one surface interlocking with the shoulders, second flanges extending laterally from both faces of the web in position to overlie the other surface of the wall sections, the second flanges being of a material plastically deformable toward the casing sections to hold the coupling member interlocked with the wall sections, and third flanges extending laterally from both faces of the web more remote from the wall than the second flanges, the third flanges providing a reaction surface for a tool to deform the second flanges toward the casing.

23. A combination as recited in claim 22 in which the edges define a closed curve and the coupling member is a split ring.

24. A combination as recited in claim 22 in which the said abutments are disposed in a recess below the corresponding surface of the wall, and in which the coupling member includes fourth flanges extending from the web into contact with the wall to shield the first flanges from direct impingement by fluid contained by the wall.

25. A combination as recited in claim 24 in which the coupling member is a composite of two sections bonded together, a first section defining the first and fourth flanges and a portion of the web, and a second section defining the remainder of the coupling member.

26. A combination as recited in claim 25 in which the first section is selected for resistance to high temperature and the second is selected for ductility.

27. A combination as recited in claim 26 in which the edges define a closed curve and the coupling member is a split ring.

28. A combination as recited in claim 22 including also filler strips disposed between the deformable flanges and the wall sections and loaded against the surface of the wall sections by the deformable flanges.

29. A combination as recited in claim 1 including also an anti-slip connection between the wall sections defined by teeth extending from the wall sections and by the deformable flanges, the deformable flanges being engaged with the said teeth.

* * * * *

PO-1050
(5/69)

UNITED STATES PATENT OFFICE
CERTIFICATE OF CORRECTION

Patent No. __3,655,223__   Dated __April 11, 1972__

Inventor(s) __Douglas Johnson__

It is certified that error appears in the above-identified patent and that said Letters Patent are hereby corrected as shown below:

Column 3, line 8, delete "position," and substitute -- to --; line 10, after "parts" insert -- are --.

Column 6, line 52, delete "outer" and substitute -- inner --.

Signed and sealed this 22nd day of August 1972.

(SEAL)
Attest:

EDWARD M. FLETCHER, JR.    ROBERT GOTTSCHALK
Attesting Officer          Commissioner of Patents